United States Patent [19]

Gojon

[11] Patent Number: 4,924,523
[45] Date of Patent: May 8, 1990

[54] BEARINGS

[75] Inventor: Roger L. Gojon, Annecy, France

[73] Assignee: The Glacier Metal Company Limited, Northwood Hills, United Kingdom

[21] Appl. No.: 241,114

[22] Filed: Sep. 6, 1988

[30] Foreign Application Priority Data

Sep. 17, 1987 [GB] United Kingdom ............... 8721841

[51] Int. Cl.⁵ .......................................... F16C 17/10
[52] U.S. Cl. ................................. 384/273; 384/275
[58] Field of Search ............... 384/275, 273, 294, 296, 384/295

[56] References Cited

U.S. PATENT DOCUMENTS

| Re. 32,764 | 4/1977 | Smith et al. | 384/275 |
| 4,017,127 | 7/1977 | Smith et al. | |
| 4,652,150 | 3/1987 | New | 384/275 |
| 4,714,356 | 12/1987 | Damour et al. | 384/294 |

FOREIGN PATENT DOCUMENTS

| 2300254 | 9/1976 | France . |
| 1297559 | 11/1972 | United Kingdom . |
| 1386253 | 3/1975 | United Kingdom . |
| 1483011 | 8/1977 | United Kingdom . |
| 1510124 | 5/1978 | United Kingdom . |
| 2134189 | 8/1984 | United Kingdom . |

Primary Examiner—Lenard A. Footland
Attorney, Agent, or Firm—William R. Hinds

[57] ABSTRACT

Flanged bearings are described comprising a substantially semi-cylindrical half journal bearing member having at least one thrust flange member, the thrust flange being substantially of a semi-circular annular form having at least three inwardly directed lugs formed on the inner periphery, two lugs being positioned at approximately the inner circumferential extremities of the flange member, the third lug being positioned on the inner periphery intermediate the first two lugs and said lugs being engageable with co-operating recesses on the half-bearings by opening the half-bearing in the elastic range and then releasing the half-bearing to retain the flange.

5 Claims, 2 Drawing Sheets

BEARINGS

The present invention relates to bearings for internal combustion engines, compressors and other machinery and particularly to bearings having thrust flanges.

Flanged bearings of unitary construction are well-known but suffer from disadvantages related to difficulty and cost of manufacture. Many variations have been proposed in the art for attaching, either temporarily or permanently, thrust flanges to half-bearings.

An objective of the present invention is to provide a bearing having thrust flanges and which is economic to manufacture.

A further objective is to provide a bearing where the flanges are easily yet permanently attached and are handleable by robots for automated engine assembly without the danger of the flanges becoming detached.

A yet further objective is to provide a bearing where the flanges have some degree of movement relative to the half-bearing to allow greater ease of positioning by robots and also to allow the flanges to be self-positioning against a bearing housing face.

A yet further objective is to provide a bearing wherein the constituent components may be fully formed and joined together without the need for any permanent post-joining, forming, deformation or machining operation to be carried out to ensure retention of the flange.

According to the present invention a bearing comprises a substantially semi-cylindrical half journal bearing member having at least one thrust flange member, the thrust flange being substantially of a semi-circular annular form having at least three inwardly directed lugs formed on the inner periphery, two lugs being positioned at approximately the circumferential extremities of the flange member, the third lug being positioned on the inner periphery intermediate the first two lugs and said lugs being engageable and axialy interlockable with co-operating recesses on the half-bearing by opening the half-bearing in the elastic range such that the lugs engage with the recesses and then releasing the half-bearing to interlock the lugs and recesses against axial separation and thus to retain the flange.

In order that the present invention may be more fully understood examples will now be described with reference to the accompanying drawings, of which:

Figure 7:
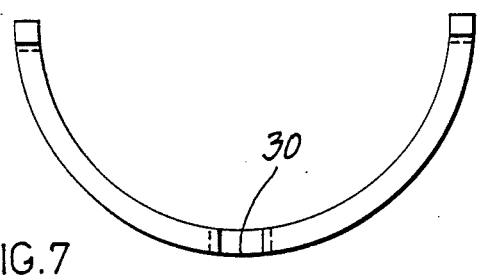
FIGS. 7 and 8 show an alternative recess.
Figure 8:
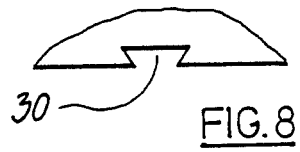
Figure 9:
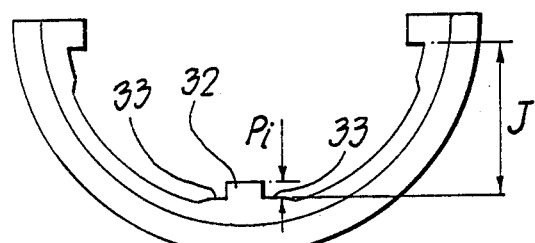
Figure 10A:
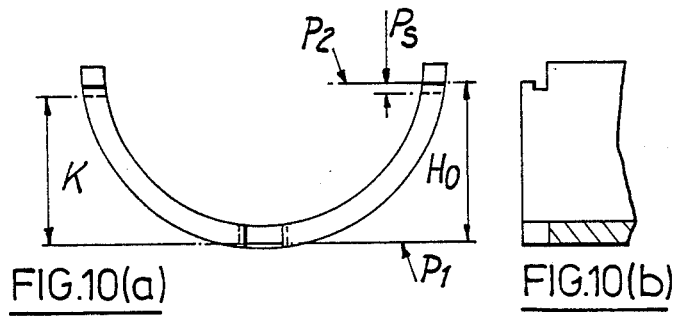
Figure 10B:
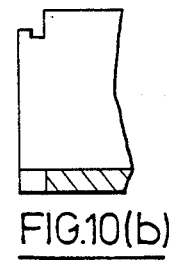

FIGS. 9 and 10(a) and 10(b) show geometrical considerations of the journal bearing and flange member relevant to FIGS. 7 and 8.

Figure 1:
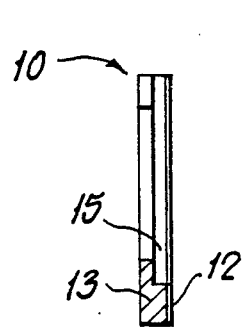
FIG. 1 shows a section through a flange member.
Figure 2:
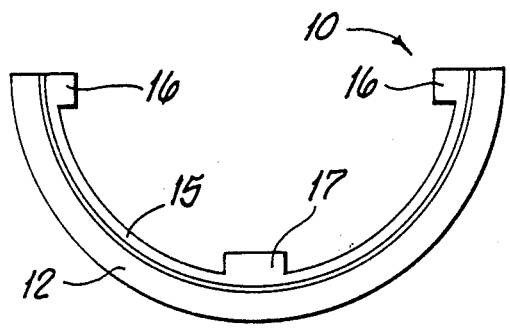
FIG. 2 shows an elevation of the flange of FIG. 1.
Figure 3:
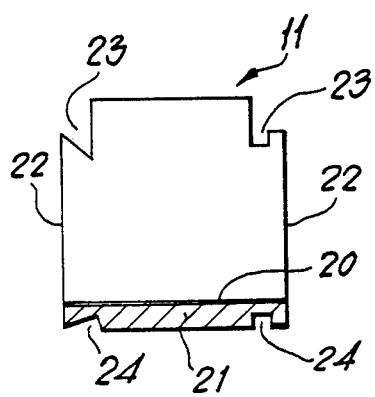
FIG. 3 shows a section through a journal bearing member.
Figure 4:
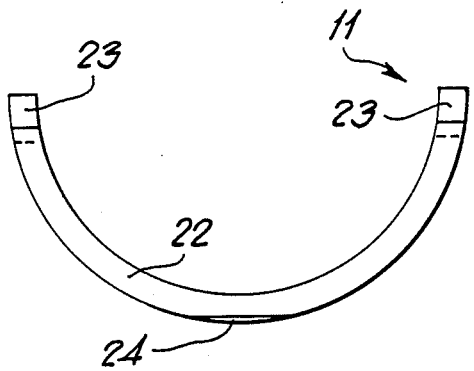
FIG. 4 shows an elevation of the journal bearing member of FIG. 3.

Referring now to FIGS. 1 and 4 and where a thrust flange is denoted at 10 and associated half-bearing at 11. The flange 10 comprises a bimetallic material having a bearing alloy layer 12 and a steel backing 13. The planform as shown in FIG. 2 is stamped from sheet or strip material, the stamped shape then being machined to remove the lining and part of the steel to leave a rebate 15 and three lugs 16,17 on the inner periphery. The thickness of the material remaining on the rebate and lugs is 20 to 60% of the initial bimetal thickness. The corresponding half bearing 11 is also formed from bimetallic sheet or strip material having a bearing alloy lining 20 and a steel backing 21. The bearing end faces 22 which are to accommodate a flange have recesses 23,24 at each joint face and intermediate the joint faces respectively. The shape of the recesses may be for example obliquely cut as shown on the left-hand side of FIG. 3 or a square-cut form as shown on the right-hand side. Other shapes of recess may of course be used provided that they fulfil the functions hereinafter described.

The recesses 23 and 24 are machined to receive the lugs 16 and 17 respectively and such that inadvertent subsequent separation is not possible.

Figure 5:
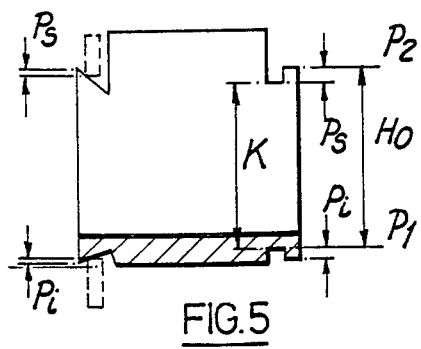
FIG. 5 shows geometrical considerations of a journal bearing relevant to FIGS. 2, 3 and 4.
Figure 6:
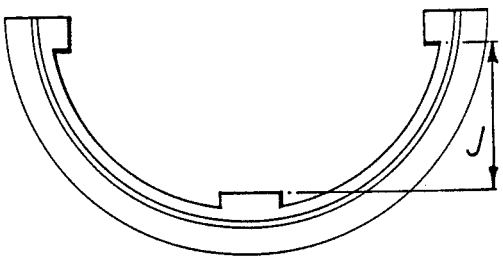
FIG. 6 shows geometrical considerations of a flange relevant to FIGS. 2, 3 and 4.

Referring now to FIGS. 5 and 6 and where FIG. 5 represents the bearing in its housing. A dimension Ho is measured between plane P1 at the bottom of the recess 24 and plane P2 which passes through the upper point or face of the recesses 23. Ho must be greater than the dimension J shown in FIG. 6 in order to prevent inadvertent separation of the flange 10 from the bearings 11. Prevention of inadvertent separation will be further ensured if the depth Ps of the recess 23 is smaller than the depth Pi of the recess 24. The flange 10 is attached to the bearing 11 prior to installation in its housing by first engaging lug 17 into the recess 24 and then slightly opening the bearing 11 in the elastic range. The effect of opening the bearing in the elastic range is to reduce the dimension Ho to less than J, thus allowing the lugs 16 to be engaged with the recesses 23.

When the bearing 11 is in its free state (i.e. not in its housing) it has what is known as "free spread". This means that when the bearing is fitted into its housing it needs to be closed slightly. Such closure is in the elastic range. The effect of free spread is that the dimension $H_1$ in the free state which corresponds to Ho when in the housing is less than Ho. Therefore, to ensure that the flange remains attached to the bearing when in the free state the dimension $H_1$ must also be greater than J.

The depths of Ps and Pi should also be sufficient such that when the flange 10 is fitted to the bearing 11 and when the bearing is fitted in its housing the dimension J is greater than the dimension K to allow relative movement between the flange and bearing. This condition is automatically met if Pi is greater than Ps.

The recesses 23 may be formed by either machining or blanking.

Assembly of the flange to the bearing may be carried out in the reverse manner to that indicated above in that the lugs 16 may initially be engaged with the recesses 23, the bearing opened slightly to achieve engagement of the lug 17 with the recess 24. To use this sequence the dimension Ps must be greater than Pi.

An alternative to the recess 24 is shown in FIGS. 7, 8, 9 and 10(a) and 10(b) where a dovetail 30 may be formed in the bearing end face. In this embodiment a tab or lug 32 locates the centre of the flange member in the dovetail recess 30, shoulders 33 dimensionally locating the flange and providing the datum for the dimension J. The dimensions J, K, Ho etc. of FIGS. 9 and 10(a) are equivalent to those of FIGS. 5 and 6 above.

In the embodiments described the mid-points of the lug 17 and recess 24 are at 90° to the bearing and flange joint faces. It is possible, however, for more than one co-operating lug and recess to be introduced intermediate the lugs 16 and recesses 23. For example two may be introduced at 60° intervals. Similar geometrical considerations would also apply in this case.

I claim:

1. A bearing, the bearing comprising a substantially semi-cylindrical half journal bearing member having at least one thrust flange member, the thrust flange being substantially of a semi-circular annular form having at least three inwardly directed lugs formed on the inner periphery, two lugs being positioned at approximately the circumferential extremities of the flange member, the third lug being positioned on the inner periphery intermediate the first two lugs and said lugs being engageable and axially interlockable with co-operating recesses on the half-bearing by opening the half-bearing in the elastic range such that the lugs engage with the recesses and then releasing the half-bearing to interlock the lugs and recesses against axial separation and thus to retain the flange.

2. A bearing according to claim 1 wherein the flange member comprises a steel-backed bearing material and the lugs are formed from the steel backing material.

3. A bearing according to claim 2 wherein the thickness of the lugs is between 20% and 60% of the initial total material thickness.

4. A bearing according to claim 1 wherein the intermediate co-operating recess is a groove formed in the journal bearing backing.

5. A bearing according to claim 1 wherein the intermediate co-operating recess is a dovetail formed in the journal bearing end face.

* * * * *